(12) United States Patent
Jörn

(10) Patent No.: US 6,273,999 B1
(45) Date of Patent: Aug. 14, 2001

(54) METHOD OF OPTIMIZING THE METERING OF CHARGE-REVERSAL AGENT INTO PAPER BROKE

(75) Inventor: Joachim Jörn, Dörpen (DE)

(73) Assignee: Nordland Papier AG, Dorpen (DE)

( * ) Notice: Subject to any disclaimer, the term of this patent is extended or adjusted under 35 U.S.C. 154(b) by 0 days.

(21) Appl. No.: 09/612,961

(22) Filed: Jul. 10, 2000

(30) Foreign Application Priority Data

Jul. 16, 1999 (EP) ................................................. 99113940

(51) Int. Cl.⁷ ................................................. D21H 11/14
(52) U.S. Cl. ........................ 162/191; 162/198; 162/263
(58) Field of Search .................................. 162/191, 263, 162/198

(56) References Cited

U.S. PATENT DOCUMENTS 5,542,542 * 8/1996 Hoffmann et al. ..................... 209/17
5,846,433 * 12/1998 Sorensen et al. ..................... 210/709

FOREIGN PATENT DOCUMENTS 2 110 190    5/1994  (CA) .
0 444 788 A1  9/1991  (EP) .

* cited by examiner

*Primary Examiner*—Dean T. Nguyen
(74) *Attorney, Agent, or Firm*—Morrison & Foerster LLP

(57) ABSTRACT

The method of optimizing the metering of charge-reversal agent into broke in the form of a suspension of fibers from paper treated in a coating machine and to be reintroduced into the production line, is distinguished by the fact that a partial stream is branched off from the main broke flow, the volume flow of the main stream and of the partial stream is measured, the turbidity of the partial stream is determined, downstream thereof the charge-reversal agent is added in a quantity that varies with time and, following that, the turbidity is again measured, in that the optimal metering rate is determined from the change in turbidity caused by the charge-reversal agent, and the said metering is carried out in the main stream in proportion to the mass or volume flows.

8 Claims, 2 Drawing Sheets

METHOD OF OPTIMIZING THE METERING OF CHARGE-REVERSAL AGENT INTO PAPER BROKE

FIELD OF THE INVENTION

The invention relates to a method of optimizing the metering of charge-reversal agent into broke in the form of a suspension of paper treated in a coating machine and to be reintroduced into the production line.

BACKGROUND AND SUMMARY OF THE INVENTION

During the manufacture of paper, inevitable waste and residual quantities are produced at the beginning and end of a paper web, during the production of cut paper sizes and so on. These considerable quantities of paper can be reused, and to this extent do not constitute "waste" and will be referred to here as "broke". In order that this broke can be reprocessed to form paper, it is broken down in an appropriate pulper to form a suspension of paper fibres, which can be introduced in to the production line together with other pulp material, in order to manufacture new paper. In a large paper mill, large quantities of broke occur so that it is not only an ecological requirement but also an economic requirement actually to reuse the broke for paper production.

High-value papers, for example wood free papers in the form of machine-calender or calender body papers are manufactured from pulps which consist of short-fibre and long-fibre pulp. Calcium carbonate is used as a filler. The surface of the body papers or raw papers is treated with cationic starch, which ensures good convertibility. Retention aids, dimer ketenes for body sizing, and colorants and optical whitening agents are used as further aids. The abovementioned materials are part of a range of mutually well-matched raw materials and aids optimized over the course of time and do not give rise to any difficulties in the paper manufacturing process. Nor are there any difficulties when broke from such papers is fed back to the production line.

For many purposes, such papers are not adequate in spite of their high value. Thus, for graphic printing, two-sided double-coated graphic printing papers with a matt or glossy finish are required. The papers are coated with a coating compound which contains various synthetic binders. Feeding coated papers back into the broke system constitutes a great problem, since the binders tend to amalgamate to form relatively large agglomerates. If the coated broke were to be used on the paper machines, this would lead to deposits on rolls, cylinders and clothing. In addition, the paper quality and the convertibility would be severely adversely affected by this. Binder agglomerates could, for example, give rise to a hole in the paper, through which the colour passes into the roll during the coating of the paper, as a result of which the paper breaks. Such inclusions also cause problems during printing. Lumps can also stick to the paper, since the latex particles which are contained in the coating compound stick together. The coating compound is applied to the paper in a relatively large amount. 30% of the finished paper is coating compound, of which in turn 10% is latex. When the coated paper is reused, considerable difficulties therefore arise.

In order to be able to reuse broke from coated paper as well, it is known to add a charge-reversal agent or a fixer to the broke suspension. These charge-reversal agents are also referred to as contrary fighter or fixing agents. The metering of the charge-reversal agent must be carried out very accurately. If too little charge-reversal agent is added, then the desired effect is not achieved. Too much charge-reversal agent is uneconomic and leads to detrimental interactions during paper making.

The state of charge of the broke suspension of coated paper lies in a highly anionic region. In order to bring about an equalization of the charge between the partial charges, as a result of which the above binder problems are eliminated, a cationic charge-reversal agent is metered in until an intend state of charge is reached.

In order to determine the correct metering rate it is known to carry out measurements with the aid of a titration procedure for determining cationic demand. A precondition for this is obtaining a filtrate from the broke suspension.

However, because of the continuously changing consistency, this is poorly reproducible and very susceptible to interference. In addition, in the case of the appropriate instruments, a considerable outlay on maintenance is necessary in order to ensure continuous on-line use. However, such measurements have to be carried out permanently in order to take into account changes in the broke quality immediately. These changes can be very considerable, since it is often the case that more or less large quantities of broke from body paper are added to the broke from coated paper, so that the binder concentration contained in the broke changes sharply which also requires a sharp change in the metering rate of charge-reversal agent.

The object of the invention is to provide a method with which the metering of charge-reversal agent can be optimized rapidly and accurately, even in the event of sharp changing proportions of coated paper in the broke.

The invention is based on the finding that the turbidity of a suspension changes when the charge-reversal agent is added. Measurements have shown that there is a very good correlation between the charge change because of the addition of a charge-reversal agent and the reduction in turbidity.

On the basis of this finding, the solution according to the invention consists in a partial stream being branched off from the main broke flow, the volume flow of the main stream and the partial stream being measured, the turbidity of the partial stream being determined, downstream thereof the charge-reversal agent being added in a quantity that varies with time and, following that, the turbidity being again measured, that the optimum metering rate being determined from the change in turbidity caused by the charge-reversal agent and the said metering being carried out in the main stream in the proportion of the volume flows.

In the partial stream, charge-reversal agent is added and, as a result, a reduction in the turbidity is determined. This reduction is only relatively small and lies in the range of, typically, 1–3%. This extremely small change can be detected by the addition of the charge-reversal agent being varied over time, in particular varied periodically. At the same time, a part of the curve is sampled which indicates the dependence of the reduction in turbidity on the concentration of charge-reversal agent. The corresponding function, that is to say the reduction in the turbidity, initially rises as the proportion of charge-reversal agent rises, then reaches a maximum and then falls off again, since in the case of excessively high quantities of charge-reversal agent, higher turbidity is again caused and foam also occurs. By means of varying the charge-reversal agent metering rate over time, the maximum of this curve may be determined accurately, this corresponding to the natural state of charge. An ideal metering rate is then fed to the main stream. The main stream treated in this way can then be fed to the paper production line.

It is expedient for the addition of the metering agent in the partial stream to be varied over time in a saw-tooth wave form or else sinusoidally.

In this case, the period of the change is approximately 30 to 300 seconds, advantageously 60 to 180 seconds. The acquisition of the measured data is carried at very short time intervals of, for example, 100 milliseconds, in order to obtain a large quantity of data, with which averaging can then be carried out, in order to obtain the function between the metering rate of the charge-reversal agent and the reduction in turbidity. The main stream is advantageously provided with a metering rate of only 90% to 99%, as referred to the maximum value of the reduction in turbidity.

BRIEF DESCRIPTION OF THE DRAWINGS

The invention will be described in the following text using an advantageous embodiment and with reference to the appended drawings, in which.

DETAILED DESCRIPTION OF THE INVENTION

Broke occurring at various points in the paper production is temporarily stored in a large container. Before being fed to the paper machines, the suspension has a charge-reversal agent added to it.

Figure 1:
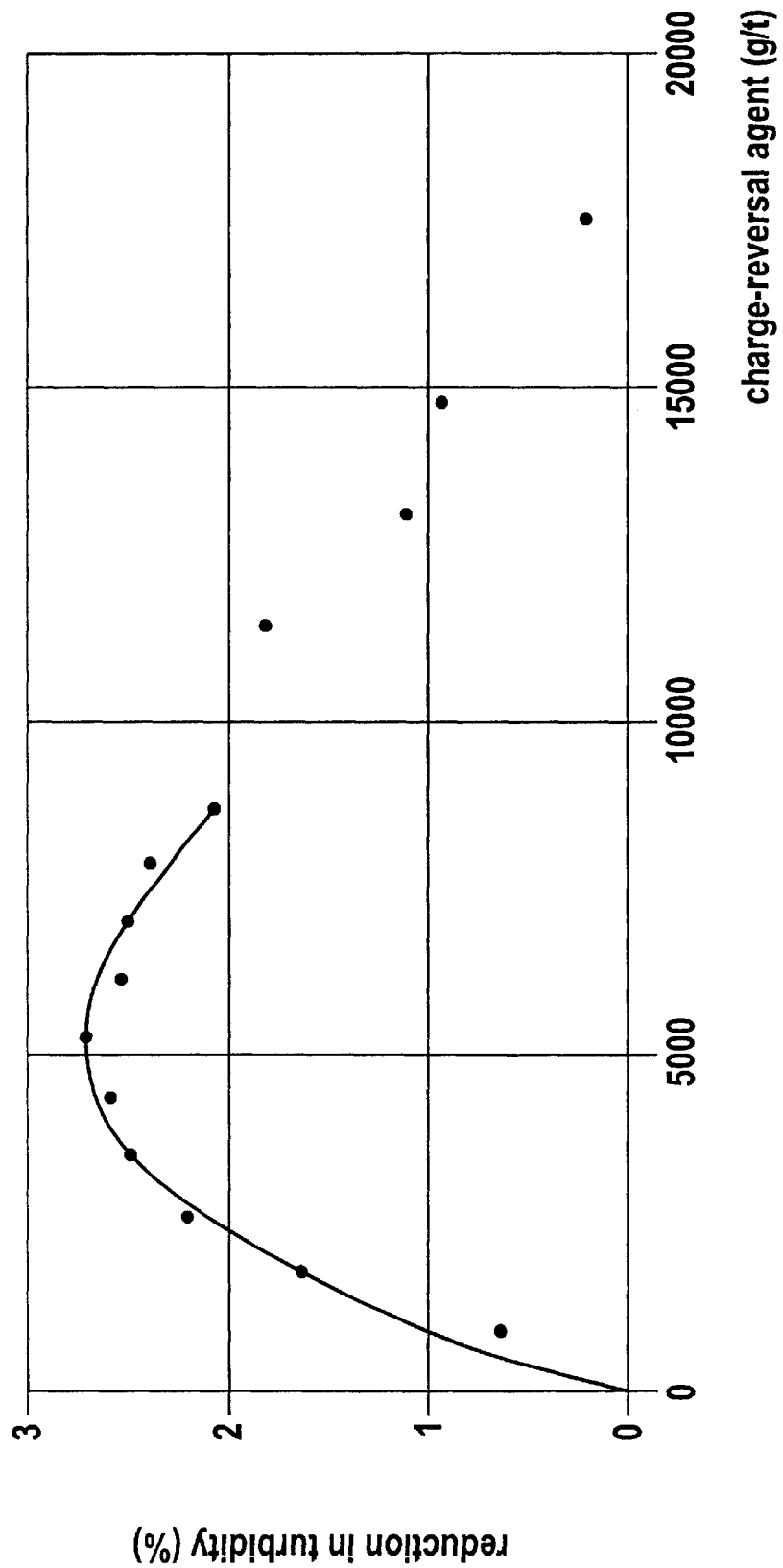
FIG. 1. shows a graphic representation of the dependence of the reduction in turbidity on the metering rate of charge-reversal agent.

As a result of the addition of the charge-reversal agent, a reduction in turbidity then takes places, as is shown in FIG. 1. As the addition rate of the charge-reversal agent increases, the relative reduction in turbidity initially increases approximately linearly then passes through a curve and a maximum and falls off again at a higher charge-reversal agent concentration. In the process, a relative reduction in turbidity only in the range from 1 –3% is achieved. However, this can be determined accurately by the addition rate of charge-reversal agent being changed periodically, for example, in the situation of FIG. 1, in the range from 2000 to 7000 g/t. As the addition rate of charge-reversal agent increases the reduction in turbidity then initially increases, reaches a maximum and then falls off again. This maximum can be detected very accurately with electronic means by the reduction in turbidity being measured every 100 milliseconds for example. By means of continuous, mathematical determination of the function, the intended relative value of the reduction in turbidity can be determined.

Figure 2:
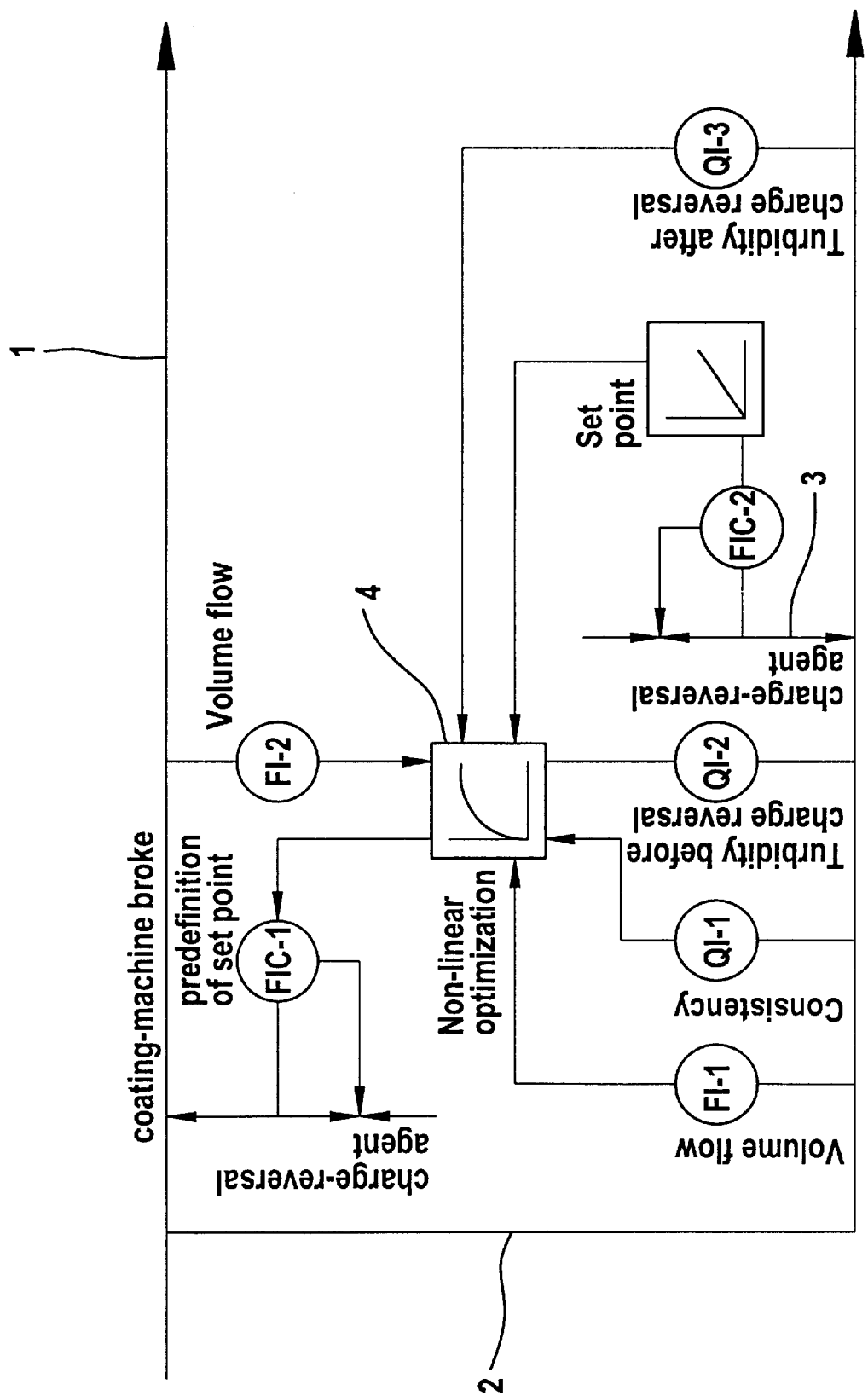
FIG. 2. shows a functional schematic drawing of the method of the invention.

According to FIG. 2, this is then done by a partial stream 2 being branched off from a main stream 1 of the broke. In this case, the broke is referred to as coating-machine broke, which means that it contains paper from coating machines, although it is also possible for broke from body paper to be contained in it. A measuring instrument FI-1 is used to measure the volume flow, and the consistency of the partial stream 2 is measured with a measuring instrument QI-1. A measuring instrument QI-2 is used to measure the turbidity upstream of the addition of charge-reversal agent, which is carried out at 3. The instrument QI-3 is used to measure the turbidity following the charge-reversal. The appropriate devices or sensors are connected to an electronic unit 4, which determines the optimum metering rate of the charge-reversal agent for the partial stream 2. For this purpose the metering device FIC-2 periodically changes the quantity of charge-reversal agent added at 3. As a result, the curve of FIG. 1 is traced and the metering rate of charge-reversal agent which results in the maximum reduction in turbidity is determined. The quantity of charge-reversal agent which is necessary to reach 90 to 99% of the maximum reduction in turbidity is predefined to the main stream as a set point.

This achieved the situation in which optimum metering with charge-reversal agent is always carried out even when the proportion of broke from coating-machine paper changes sharply or various coated paper grades (matt, glossy, and so forth) are contained in the broke and the mixture changes rapidly and sharply.

The method is particularly accurate and reliable, since only relative measured variables are used for evaluations. What is concerned is only the quantity of charge-reversal agent which results in the desired reduction in turbidity. The magnitude of this reduction in turbidity does not play any part.

The change in the metering rate in the main stream 1 can be made completely automatically. On the other hand however, manual control on the basis of the measure values obtained in the partial stream 2 is also possible, in order in this way to adapt the metering rate to changing conditions.

What is claimed is:

1. A method of optimizing the metering of a charge-reversal agent into a broke stream comprising:

branching off a partial broke stream from a main broke flow, wherein the main broke flow comprises an aqueous suspension of fibers from paper treated in a coating machine and to be reintroduced into the production line;

measuring the volume of flow of the main broke flow;

measuring the volume of flow of the partial broke stream;

measuring a first turbidity of the partial broke stream;

adding a charge-reversal agent to the partial broke stream at an addition rate that varies over time;

measuring a second turbidity of the partial broke stream;

determining an optimal charge-reversal agent metering rate for the partial broke stream, wherein the optimal charge reversal agent metering rate is a function of the difference between the first turbidity and the second turbidity;

determining an optimal charge-reversal agent metering rate for the main broke flow by multiplying the optimal charge-reversal agent metering rate for the partial broke stream by the ratio of the volume of flow of the main broke flow to the volume of flow of the partial broke stream; and metering, a charge-reversal agent into the main broke flow at the optimal charge-reversal agent metering rate determined for the main broke flow.

2. The method of claim 1, further comprising measuring the consistency of the partial broke stream prior to determining an optimal charoe reversal agent metering rate for the main broke flow.

3. The method of claim 1 or 2, wherein the addition rate of the charge-reversal agent is varied over time in a saw-tooth wave form.

4. The method of claim 3, wherein the period of the change of the saw tooth waveform is from approximately 20 to approximately 300 seconds.

5. The method of claim 3, wherein the period of the change of the saw tooth waveform is from approximately 60 to approximately 180 seconds.

6. The method of claim 1 or 2, wherein the addition rate of the charge-reversal agent is varied over time sinusoidally.

7. The method of claim 1 or 2, further comprising metering into the main stream at a rate of about 90 to 99% of the determined ideal value.

8. The method of claim 1 wherein the optimal charge-reversal metering rate for the main broke flow is determined by multiplying the optimal charge-reversal agent metering rate of the partial broke stream by the ratio of the mass of the main broke flow to the mass of the partial broke stream.

* * * * *